US007894460B2

(12) United States Patent
Carpman et al.

(10) Patent No.: US 7,894,460 B2
(45) Date of Patent: Feb. 22, 2011

(54) PROGRAMMABLE LOGIC CONTROLLER PROTOCOL CONVERTER

(75) Inventors: Joshua Carpman, Houston, TX (US); Travis R. Cummings, The Woodlands, TX (US); Hamid J. Rabat-Torki, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 181 days.

(21) Appl. No.: 12/180,334

(22) Filed: Jul. 25, 2008

(65) Prior Publication Data
US 2009/0028184 A1  Jan. 29, 2009

Related U.S. Application Data (60) Provisional application No. 60/952,118, filed on Jul. 26, 2007.

(51) Int. Cl.
*H04L 12/56* (2006.01)
*H04J 3/22* (2006.01)
*G06F 15/16* (2006.01)

(52) U.S. Cl. .................. 370/401; 370/466; 370/469; 709/217

(58) Field of Classification Search ......... 370/465–467, 370/351–356, 400–408, 469; 709/201–203, 709/217–219, 230–237
See application file for complete search history.

(56) References Cited

U.S. PATENT DOCUMENTS

| 6,961,753 | B1 * | 11/2005 | Osburn, III | 709/203 |
|---|---|---|---|---|
| 7,027,452 | B2 * | 4/2006 | Beckwith | 370/407 |
| 2003/0147420 | A1 * | 8/2003 | Beckwith | 370/466 |
| 2006/0041630 | A1 | 2/2006 | Naismith | |
| 2006/0047841 | A1 * | 3/2006 | Brown et al. | 709/230 |
| 2006/0067209 | A1 * | 3/2006 | Sheehan et al. | 370/216 |

(Continued)

FOREIGN PATENT DOCUMENTS

WO    2007075105    7/2007

OTHER PUBLICATIONS

Michael Kunes et al., "Fieldbus-Internet Connectivity: The SNMP Approach" IEEE Transactions on Industrial Electronics, IEEE Service Center, Piscataway, NJ; vol. 48, No. 6, Dec. 1, 2006, SP011023899 ISSN: 0278-0046, p. 1250; p. 1255, Figs. 2-5.

(Continued)

*Primary Examiner*—Tri H. Phan
(74) *Attorney, Agent, or Firm*—Donna Blalock Holguin (57) ABSTRACT

A programmable logic controller (PLC) protocol converter is disclosed that allows a supervisory control and data acquisition (SCADA) system to effectively communicate with a PLC device using a desired communications protocol, particularly in cases where the PLC device does not "speak" the desired communications protocol. A first thread may be configured to continually read PLC addresses, one at a time, using a communications protocol understood by the PLC device. The first thread may store the data values in the shared data array within program memory. Thus, the first thread exposes data from the PLC device, as specified in the configuration file. At the same time, a second thread may be configured to serve the data in the shared data array according to a second communications protocol, e.g., to the SCADA system.

21 Claims, 4 Drawing Sheets

U.S. PATENT DOCUMENTS

2010/0046545 A1* 2/2010 Kagan et al. ................ 370/466

OTHER PUBLICATIONS

PCT Search Report for PCT/IB2008/053012.
PCT Written Opinion for PCT/IB2008/053012.

Search Report from EP 2174196.
Control Solutions, Inc: "Babel buster SP", [online] XP002505174, Minnesota, USA URL:http://www.csimn.com/CSI_pages/BabelBusterSP.pdf>.

* cited by examiner

PROGRAMMABLE LOGIC CONTROLLER PROTOCOL CONVERTER

This application claims the benefit under 35 U.S.C. §119(e) to provisional application No. 60/952,118 filed Jul. 26, 2007, the entire contents of which are incorporated herein by reference.

BACKGROUND

Many industrial facilities employ a device commonly referred to as a PLC—short for Programmable Logic Controller. As is known, a PLC provides a microprocessor-based industrial control system. The PLC communicates with other process control components through data links. PLCs are used in process control for simple switching tasks (e.g., opening and closing a valve), PID control, complex data manipulation, arithmetic operations, timing and process and machine control, etc. For example, a PLC may be connected to sensors configured to supply temperatures, pressures, flow rates, and a variety of other numerical values related to the operational state of an industrial operation. Similarly, the PLC may also collect information on discrete values such as whether a given valve is open or closed. The PLC may be configured store this information in specific addresses, registers, or database locations.

Further, the microprocessor included in the PLC may be configured to engage in a variety of process control actions, based on the reported data. For example, a PLC may be programmed to maintain a specific temperature in a process chamber. In such a case, the PLC may perform actions to increase the temperature (e.g., close/open valves, increase fuel flowing to a combustion chamber, etc.) when the temperature falls below a specified minimum. Similarly, the PLC may perform the opposite actions to decrease the temperature when it exceeds a specified maximum.

Additionally, a PLC may be configured to respond to requests for information on what value was recorded for a given sensor at any given point in time. Such requests typically take the form of a request for a specific memory location or database value. Further, such requests must be formatted using a communications protocol "understood" by the PLC. In some cases, the ability for a PLC to speak a given communication protocol may be augmented by adding a communication card to the PLC. However, adding a communications card to the PLC frequently requires extensive PLC configuration and often a plant shutdown, which can be extremely disruptive. Further, some communication cards only provide access to limited data from a PLC device—thus this approach may simply fail, depending on what data from the PLC a plant operator desires to retrieve.

SUMMARY

One embodiment of the invention provides a method for exposing data from a programmable logic controller (PLC) device. The method generally includes accessing a configuration file identifying a plurality of PLC addresses to expose and initializing a shared memory array. The shared memory array includes a plurality of elements each used to store data obtained from the PLC device. The method also includes invoking a first thread. The first thread is may generally be configured to, repeatedly, transmit a request for one of the identified PLC addresses and store a data value returned by the PLC device in response to the request in one of the elements of the shared memory array. Each request is configured according to a first communication protocol. The method may also include invoking a second thread. The second thread may generally be configured to receive a request, communicated according to a second communication protocol, for one or more of the data values stored in the shared memory array, to retrieve the requested one or more data values, and to return the requested data values in a format consistent with the second communication protocol.

Another embodiment of the invention includes a computer-readable storage medium containing a program configured to perform a non-intrusive method for exposing data from a PLC device, the program including instructions for performing an operation. The operation may generally include accessing a configuration file identifying a plurality of PLC addresses to expose and initializing a shared memory array. The shared memory array includes a plurality of elements each used to store data obtained from the PLC device. The operation may also include invoking a first thread. The first thread is may generally be configured to, repeatedly, transmit a request for one of the identified PLC addresses and store a data value returned by the PLC device in response to the request in one of the elements of the shared memory array. Each request is configured according to a first communication protocol. The operation may also include invoking a second thread. The second thread may generally be configured to receive a request, communicated according to a second communication protocol, for one or more of the data values stored in the shared memory array, to retrieve the requested one or more data values, and to return the requested data values in a format consistent with the second communication protocol.

Still another embodiment of the invention includes a system having a processor and a memory containing a program configured to perform an operation for obtaining data values from a PLC device. The operation performed by the program may generally include accessing a configuration file identifying a plurality of PLC addresses to expose and initializing a shared memory array. The shared memory array includes a plurality of elements each used to store data obtained from the PLC device. The operation may also include invoking a first thread. The first thread is may generally be configured to, repeatedly, transmit a request for one of the identified PLC addresses and store a data value returned by the PLC device in response to the request in one of the elements of the shared memory array. Each request is configured according to a first communication protocol. The operation may also include invoking a second thread. The second thread may generally be configured to receive a request, communicated according to a second communication protocol, for one or more of the data values stored in the shared memory array, to retrieve the requested one or more data values, and to return the requested data values in a format consistent with the second communication protocol.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Embodiments of the invention provide a PLC protocol converter system that allows a SCADA system to effectively communicate with a PLC device using a desired communications protocol, particularly in cases where the PLC device does not "speak" the desired communications protocol. A SCADA system, short for Supervisory Control And Data Acquisition system, centralizes process data and allows remote monitoring and control a variety of industrial systems. A SCADA system may be configured to gather data in real time from remote locations in order to control equipment and conditions in a pipeline (e.g., a hydrocarbon pipeline, or a hydrogen pipeline). For example, a SCADA system may be configured to send a request to a PLC controller for the values recorded at addresses in memory representing the then current value of a sensor within an industrial plant, or a discrete state of a component in the industrial plant. For the SCADA system to communicate with a PLC, both must be able to communicate using a compatible communications protocol.

In one embodiment, the PLC converter system may be a computer (e.g., an embedded system) configured to communicate with both the PLC device and the SCADA system by executing an application program. In practice, the program may read a configuration file which identifies what data elements (e.g., memory values, register values, or database field values) are desired from the PLC, and a set of memory addresses (e.g., MODBUS addresses) to map the data once collected from the PLC. The collected data may be stored in elements of a shared memory array based on the memory addresses in the configuration file. The configuration file may be transmitted to the PLC converter using known communication protocols (e.g., ftp).

Further, the program may include a first thread configured to continually read the desired PLC addresses, one at a time, using a communications protocol understood by the PLC device. For example, the PLC converter may be physically connected to the PLC device using a serial connection, allowing the program send requests for information using a serial-line protocol understood by the PLC device. In a particular embodiment, the protocol is the known Non-Intelligent Terminal Protocol (NITP). The first thread may store the data values in the shared data array within program memory. Thus, the first thread exposes data from the PLC device, as specified in the configuration file.

At the same time, the program may also include a second thread configured to serve the data in the shared data array according to a second communications protocol, e.g., to a SCADA system. For example, the second thread may serve data from the shared memory using the known TCP-MODBUS protocol to a SCADA system that "understands" the TCP-MODBUS protocol. Doing so allows data from the PLC device to be shared to any MODBUS master poll that is received via an Ethernet port present on the PLC converter system. Thus, in practice, the PLC converter system masquerades as the PLC device, for responding to MODBUS message requests. Further, if data points are desired to be added (or removed) from the set exposed by the first thread, a user simply modifies the configuration file, uploads it to the PLC converter system (e.g., via ftp), and restarts the program (e.g., using an HTTP-based diagnostic interface).

Advantageously, embodiments of the invention may be used to provide read-only access to any data type within a PLC database (e.g., numeric, discrete, etc) and to provide the data in a protocol that the SCADA system understands. Further, embodiments of the invention do not require any configuration within the PLC device itself, or any processor restart/shutdown to function; can be connected/disconnected from the PLC device without any effect on the PLC device; and may be connected to the SCADA system (e.g., via a TCP connection) to allow for remote configuration, administration, and use.

Note, embodiments of the invention are described herein relative to a specific PLC device—namely, a series 5×5 device—commercially available from Siemens, AG of Berlin, Germany. As is known, the series 5×5 (and the series 505 in particular) provides a PLC device capable of responding to requests formatted using the Non-Intelligent Terminal Protocol (NITP) over an RS-232 serial connection, but does not (at least without certain add-on communications cards) support requests for data using a MODBUS poll. Further, as is also known, even with the add-on communications card, the MODBUS data mapping provided by the communications cards only allows access to a subset of the available data types in the PLC database. However, the series 5×5 device is merely illustrative and the invention is not so limited, as will be appreciated by those of ordinary skill in the art.

One embodiment of the invention may be implemented as one or more software programs for use with a computer system. The program(s) include instructions for performing embodiments of the invention (including the methods described herein) and may be stored on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD-ROM or DVD-ROM drive) and/or (ii) writable storage media on which alterable information is stored (e.g., floppy disks within a diskette drive, hard-disk drives, or flash memory devices). Other media include communications media through which information is conveyed to a computer, such as a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

Further, the description herein references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In general, the routines executed to implement the embodiments of the invention, may be part of an operating system or a specific application, component, program, module, object, or sequence of instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
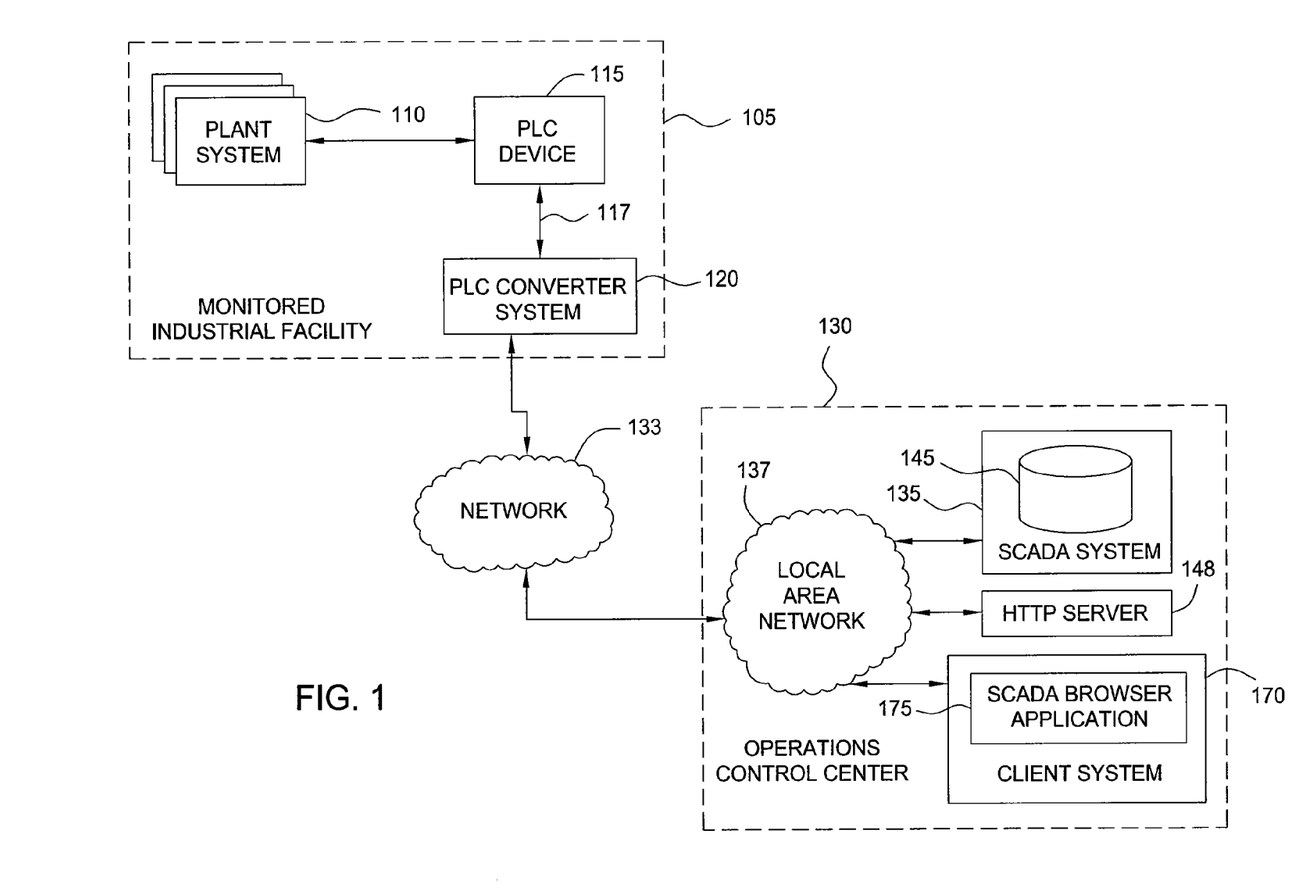
FIG. 1 is a conceptual illustration of a monitored industrial facility and an operations control center that includes a SCADA system configured to communicate with a PLC converter system and a PLC device, according to one embodiment of the invention.

FIG. 1 is a conceptual illustration of a monitored industrial facility 105 and an operations control center 130 that includes a SCADA system 135 configured to communicate with a PLC converter system 120 and a PLC device 115, according to one embodiment of the invention. As shown, the monitored industrial facility 105 includes a collection of plant system 110 monitored and managed by the PLC device 115. The collection of plant system 110 is included to be representative of a variety of industrial processes controlled by the PLC device 115. Examples of plant systems include cryogenic air separation units, water treatment plants, liquid product vaporizers, and hydrogen purification units. As stated, the PLC device 115 provides a programmable logic controller configured to communicate with other process control components through data links, and PLC device 115 may be used in process control for simple switching tasks (e.g., opening and closing a valve), PID control, complex data manipulation, arithmetic operations, timing and process and machine control, etc. In a particular embodiment, the PLC device 115 is a series 5×5 device commercially available from Siemens, AG of Berlin, Germany. Of course, other PLC devices having the characteristics described herein may be used.

In one embodiment, the PLC device 115 may respond to requests from a PLC converter system 120. Such requests may be formatted using a communications protocol and transmitted over a data link established between the PLC device 115 and the PLC converter system 120. For example, the PLC converter system 120 may be configured to communicate with the PLC device 115 using a serial line connection (represented by an arrow 117) to transmit a request (and receive a response) using the NITP protocol.

At the same time, the PLC converter system 120 may also be configured to communicate with the SCADA system 135 over a network 137 (represented by an arrow 119). For example, the SCADA system 135 may submit a MODBUS master poll to the PLC converter system 120 requesting a block of recognized MODBUS addresses. In response, an application program executing on the PLC converter system 120 may retrieve values for the requested addresses from a shared memory array and transmit them to the SCADA system 135.

In a particular embodiment, the PLC converter system 120 is a model UC-7110 embedded computer system commercially available from Moxa®, Inc, configured with a multi-threaded application program, as described in greater detail herein. As is known, the model UC-7110 provides a RISC-based ready-to-run computer with two serial ports, and dual local area networks. Of course, embodiments of the invention may be adapted for use with other computing devices having the characteristics described herein.

In one embodiment, the results of a request from the SCADA system 135 are transmitted to operations control center 130. The operations control center 130 may employ a number of computer systems running application programs used to coordinate, monitor, and control the operations the monitored industrial facility 105. Illustratively, the pipeline operations control center 130 includes the SCADA system 135, a SCADA database 145, an HTTP server 148 and a client system 170, configured to communicate with one another over a local area network 137. Note, the computer systems 135 and 170 illustrated in operations control center 130 are included to be representative of existing computer systems, e.g., desktop computers, server computers, laptop computers, tablet computers and the like. However, embodiments of the invention are not limited to any particular computing system, application, device, architecture or network, and instead, may be adapted to take advantage of new computing systems and platforms as they become available. Additionally, one skilled in the art will recognize that the illustrations of computer systems 135, 148, and 170 are simplified to highlight aspects of the present invention and that computing systems and networks typically include a variety of components not shown in FIG. 1.

As stated, SCADA system 135 may be configured to centralize process data from a variety of industrial operations and to allow remote monitoring and control of monitored industrial facility 105. Illustratively, data received by the SCADA system 135 is stored in a database 145. Further, a browser application 175 may be configured to request data from database 145 regarding the then existing (or historical) state of monitored industrial operations. Typically, HTTP server 148 is configured to transmit HTML web pages rendered by a web browser (e.g., SCADA browser application 175), where the content of the web pages presents the information from database 142 in a structured form. Accordingly, client computer system 170 includes a web browser 175, used to render information received from web server HTTP server 148. Note, although database 145 and web server 148 are shown as separate systems, one of ordinary skill in the art will recognize that these components may be organized on and configured in a variety of ways.

Figure 2:
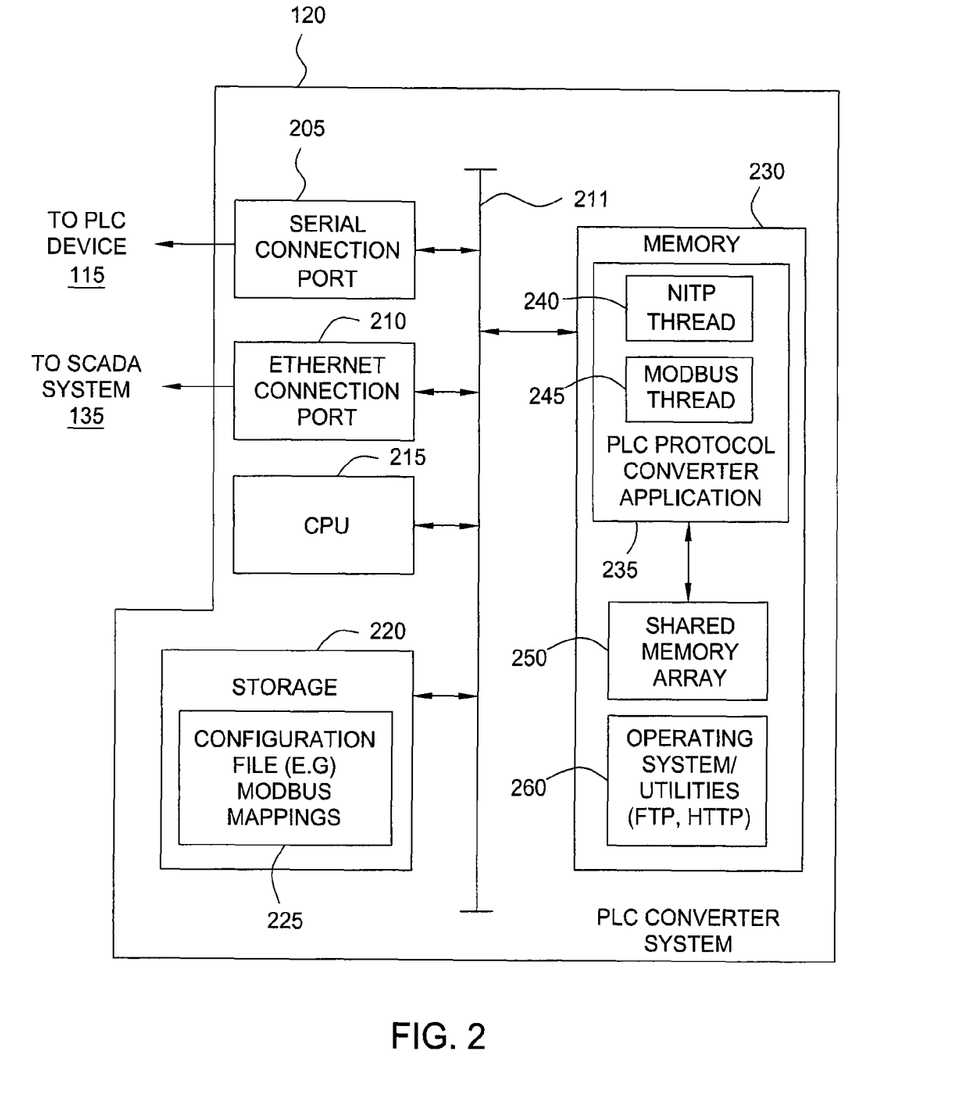
FIG. 2 is a block diagram illustrating components of a PLC converter system configured to perform a PLC protocol conversion process, according to one embodiment of the invention.

FIG. 2 is a block diagram illustrating components of a PLC converter system 120 configured to perform a PLC protocol conversion process, according to one embodiment of the invention. As shown, the PLC converter system 120 includes a CPU 215, a storage device 220, a memory 230, a serial connection port 205 and an Ethernet connection port 210, each connected to a bus 211. CPU 215 is included to be representative of a single CPU, multiple CPUs, a single CPU having multiple processing cores, and the like. For example, the Moxa® embedded system includes an ARM9 32-bit 192 MHz processor. Storage device 220 may provide a persistent storage area for application programs and data for use by PLC converter system 120. Examples of storage device 220 include one or more hard-disk drives, solid-state memory devices, optical media, etc. Illustratively, storage 220 is shown to include a configuration file 220. In one embodiment, the configuration file 225 provides a set of comma separated values (CSV) indicating which PLC device addresses are to be made available through the PLC converter system 120 and which MODBUS addresses each such address should be mapped to by the PLC converter system 120 (e.g., which MODBUS address).

Memory 230 can be one or a combination of memory devices, including random access memory, nonvolatile or backup memory, (e.g., programmable or flash memories, read-only memories, etc.). Illustratively, the memory 230 stores an operating system 260, a shared memory array 250, and a PLC protocol converter application 235. The operating system 260 used to manage hardware and software executing on the PLC converter system 120, including PLC protocol converter application 235. Additionally, operating system 260 may include any number of utility applications (e.g., an FTP or HTTP server process) as needed to interact with the PLC converter system 120 and PLC protocol converter application 235.

As shown, PLC protocol converter application 235 includes a first thread 240 (labeled as NITP thread) and a second thread 245 (labeled as MODBUS thread). In one embodiment, the first thread 240 is configured to continually read the addresses in the PLC device 115 that are identified in the configuration file 225. Further, the addresses may be read, one at a time, using a communications protocol understood by the PLC device 115 (e.g., the NITP protocol understood by the Siemens, AG series 505 PLC). The first thread 240 may store data values read from the PLC device 115 in the shared memory array 250. Thus, the first thread 240 exposes data from the PLC device 115, as specified in the configuration file 225.

At startup, the PLC protocol converter application 235 reads the configuration file 225 describing which PLC addresses are desired and which MODBUS addresses to map them to. In one embodiment, the information read from the configuration file 225 is evaluated in order to construct a set of messages used by the first thread 240 to gather the data values from the PLC device 115. For example, NITP is limited in how many elements of data that can be communicated in one message, thus the messages are generally constructed to ensure that the PLC device 115 is not overburdened with data requests. Once the messages are constructed, the first thread 240 begins sending them one at a time to the PLC device 115, each time awaiting a response before sending the next one. Data from each successive response is stored in the shared memory array 250, for use by the second thread 245 of the PLC protocol converter application 235. In one embodiment, the first thread 240 sends the messages repeatedly at regular intervals in an infinite loop, until an interrupt is received directing the PLC protocol converter application 235 to shut down.

The second thread 245 is generally configured to serve data stored in the shared memory array 250 to the SCADA system 135. That is, the second thread 245 may generally be configured to act as a MODBUS slave device, providing MODBUS address values on demand. For example, in one embodiment, the second thread 245 waits for a command request from the SCADA system 135 via a TCP connection established over Ethernet port 210 and responds with the requested values from the shared memory array 250. Like the first thread 240, the second thread 245 also may generally run in an infinite loop, always waiting for new data requests from the SCADA system 135 until an interrupt is received directing the PLC protocol converter application 235 to shut down.

Figure 3:
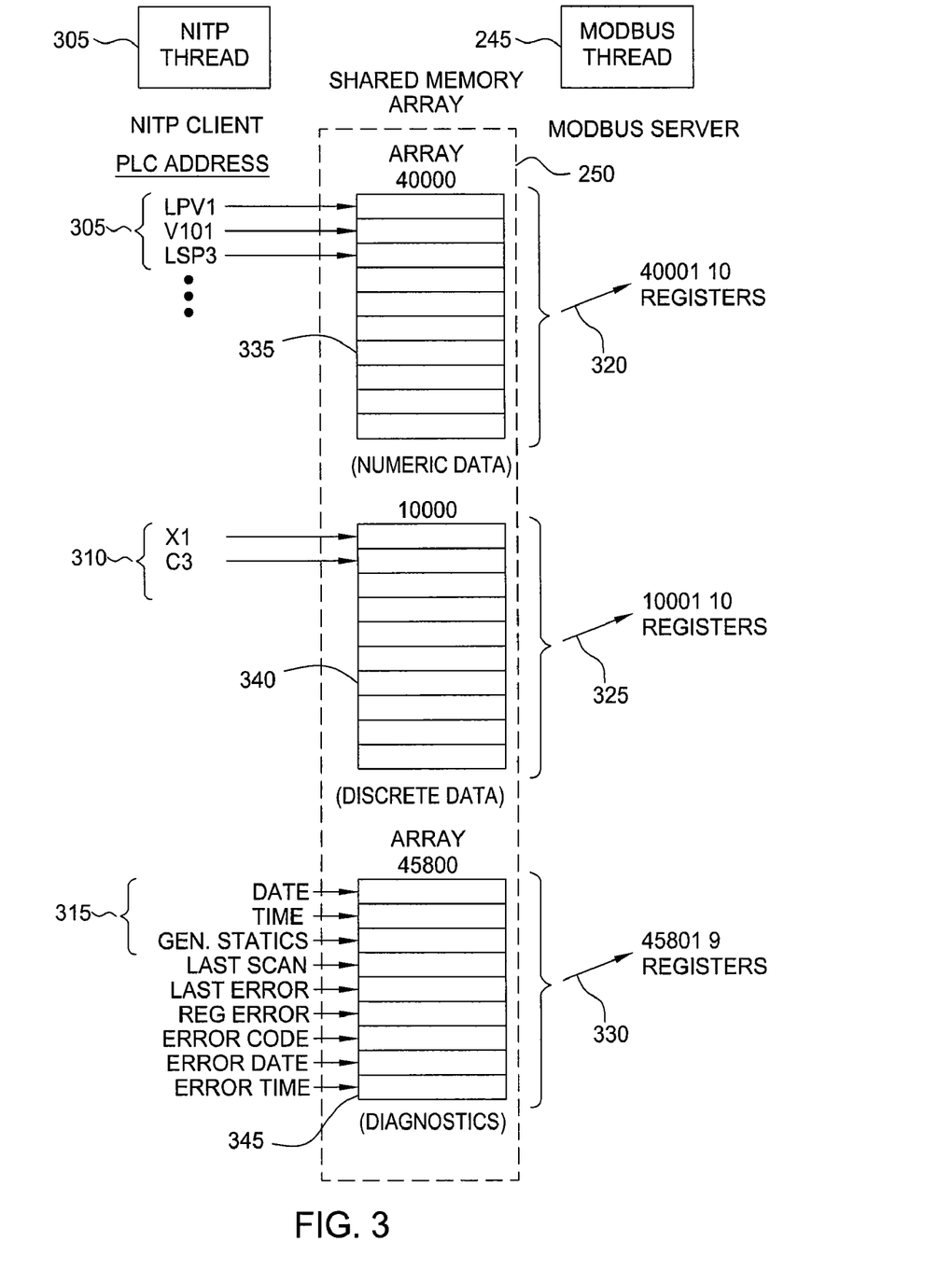
FIG. 3 is a conceptual illustration of a shared memory array used by a PLC protocol converter to allow communications with a PLC device using a desired communication protocol, according to one embodiment of the invention.

FIG. 3 is a block diagram further illustrating the shared memory array 250 used by a PLC protocol converter application 235, according to one embodiment of the invention. As shown, the shared memory array 250 includes a collection of array slots for numeric data values 335, a collection of array slots for discrete data values 340 and a collection of array slots for diagnostic values 345. Additionally, operations of the first thread 240 (labeled as NITP thread) are generally represented to the left of the shared memory array 250 in FIG. 3 and the operations of the second thread 245 (labeled as MODBUS thread) are generally represented to the right of the shared memory array 250 in FIG. 3. In one embodiment, each slot for one of the numeric data values 335 and discrete data values 340 is used to store a data value retrieved from the PLC device 115. Each slot for one of the numeric data values 335 and discrete data values 340 may also be associated with a MODBUS address, allowing the second thread 245 to respond to requests for MODBUS address values received from SCADA system 135.

In one embodiment, the array slot for each numeric data value provides a four-byte memory space to store a floating point number. Numeric data values 335 typically store a measurement of some aspect of industrial facility 105 that can fall along a continuous range, e.g., a temperature, pressure, flow-rate, etc. Discrete data values 340 typically store a measurement of some aspect of industrial facility 105 that can take an integer or Boolean value, e.g., an integer count or position of a switch as being "on" or "off."

Illustratively, FIG. 3 shows an "LPV1," address a "V101" address and an "LSP3" address being pulled from the PLC device 115, and stored in the first three array slots of the numeric data values 335 in shared memory array 250. As is known, the "LPV1," "V101," and "LSP3" addresses correspond to process variable for control loop 1, general memory variable 101, and setpoint for control loop 3, respectively, for the Siemens Series 505 PLC device. Further, in this example, the array slots map to the first three values for a "40,000" series of MODBUS addresses. As is also known, MODBUS addresses are subdivided into blocks, the "40,000" series being universally understood to be "holding registers", containing numeric data. In one embodiment, the SCADA system 130 may request any of the numeric data values 335 by sending a message to second thread 245 over the Ethernet connection 210. In response, the second 245 thread retrieves the requested values from the shared memory array 250 and transmits them to SCADA system 130 over the Ethernet connection 210, as indicated by an arrow 320.

Similarly, FIG. 3 shows an "X1," address and a "C3" being pulled from the PLC device 115, and stored in the first three array slots for the discrete data values 340 in shared memory array 250. As is known, the "X1" and the "C3" PLC addresses correspond to switch status 1 and output coil 3, respectively, for the Siemens Series 505 PLC device. Further, in this example, the array slots map to the first three values for a "10,000" series of MODBUS addresses. As with the numeric data values 335, the SCADA system 130 may also request any of the discrete data values 340 by sending a message to second thread 245 over the Ethernet connection 210. In response, the second thread 245 retrieves the requested values from the shared memory array 250 and transmits them to SCADA system 130 over Ethernet connection 210, as indicated by an arrow 325.

In one embodiment, in addition to pulling data values from the PLC device 115, the first thread 240 may also be configured to write information to the slots reserved in the shared memory array 250 for diagnostic values 345. For example, FIG. 3 shows array slots reserved for diagnostic information such as date, Time, general status, etc. The diagnostic values 345 may be generally useful for recording information related to the operating state of the protocol converter application 235 and/or PLC converter system 120. Like the PLC address values, the SCADA system 130 may send a request for diagnostic values 345 to the second thread 245. In response the second thread 245, retrieves the requested values from the shared memory array 250 and transmits them to SCADA system 130 over the Ethernet connection 210, as indicated by an arrow 330.

Figure 4:
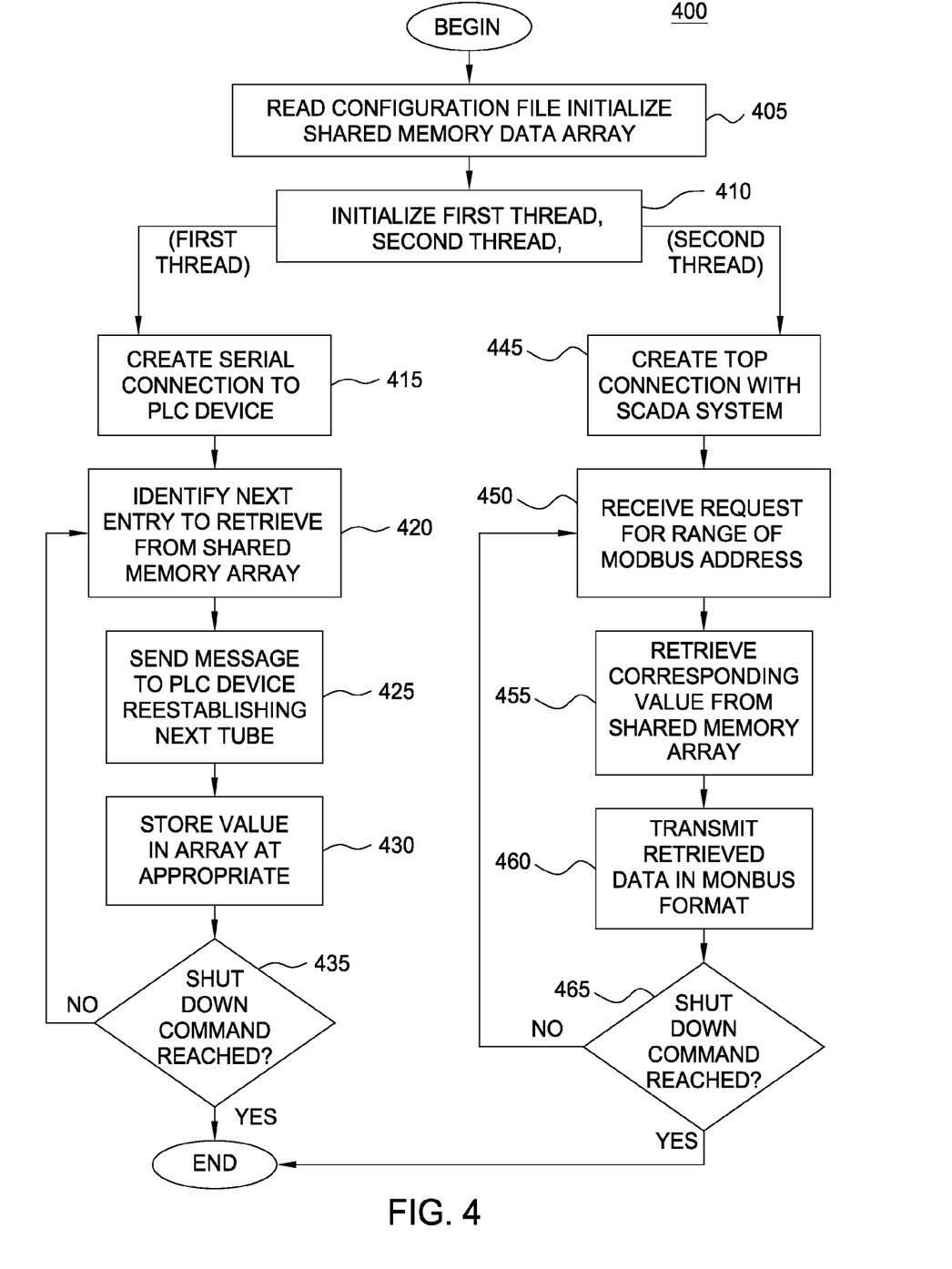
FIG. 4 illustrates a method for a PLC protocol converter to communicate with a PLC device using a desired communication protocol, according to one embodiment of the invention.

FIG. 4 illustrates a method 400 for a PLC protocol converter application 235 to communicate with a PLC device 115 using a desired communication protocol, according to one embodiment of the invention. In one embodiment, the method 400 may be performed using the PLC protocol converter application 235 being used to communicate with a PLC device 115 (e.g., a Siemens, AG Series 505 PLC device) and a SCADA system 130, as discussed above. However, one of ordinary skill in the art will recognize that examples of specific equipment, software, and products are used herein for illustrative purposes, and other types of these items may be used without departing from the scope of the present invention.

As shown, the method 400 begins at step 405 where the PLC protocol converter application 235 begins executing. In one embodiment, the application may read the configuration file 225 and create the shared memory array 250. Initially, the array 250 includes slots for numeric data values 335, discrete data values 340 and diagnostic values 345, as specified by the configuration file 225, but without any actual data in the individual array members. At step 410, the PLC protocol converter application 235 may initialize the first thread 240 and second thread 245. The operations of the first thread 240 are described with reference to steps 410-435, and the operations of the second thread 245 are described with reference to steps 445-465.

At step 415, the first thread 240 establishes a connection with the PLC device 115. For example, as described above, an RS-232 serial connection may be established with the Siemens, AG Series 505 PLC device. Steps 420-435 represent a loop performed by the first thread 240 so long as the PLC protocol converter application 235 continues to execute. At step 420, the first thread 240 identifies the next data value to be requested from the PLC device 115. For example, the first thread 240 may maintain an index representing the last updated value in the shared memory array 250. In such a case, the first thread 240 simply increments the index to the next value on each pass through the loop of steps 420-435. At step 425, the first thread 240 may send a message to the PLC device 115 requesting the PLC address identified at step 420. For example, as described above, a message composed using the NITP protocol may be sent to a Siemens, AG Series 505 PLC device. Once a response is received, the value transmitted from the PLC device 115 is stored in the appropriate position of the shared memory array 250 (step 430). At step 435, the first thread 240 may determine whether a shutdown command has been received (e.g., via an interrupt). However, so long as the PLC protocol converter application 230 continues to execute, the first thread 240 continues to read the desired PLC addresses, one at a time.

In one embodiment, the second thread 245 responds to requests from the SCADA system 130 for values from the shared memory array 250, while such values are being updated by the first thread 240. At step 445, the second thread 445 establishes a connection with the SCADA system 130. For example, as described above, the PLC protocol converter application 235 may be configured to establish a TCP connection with the SCADA system 120, allowing the second thread 245 to act as a MODBUS slave device. Steps 450-460 represent a loop performed by the second thread 245 so long as the PLC protocol converter application 235 continues to execute. At step 450, the second thread 240 receives a request for a range of values from the shared memory array 250. In one embodiment, the request may be formatted as a MODBUS request for a range of MODBUS addresses. At step 445, the second thread 245 retrieves the requested values from the shared memory array 250, and at step 450, transmits the requested data to the SCADA system 130 in the appropriate format (e.g., a MODBUS format). At step 465, the second thread 240 may determine whether a shutdown command has been received (e.g., via an interrupt). However, so long as the PLC protocol converter application 235 continues to execute, the second thread may wait for, and respond to, requests for information from the shared memory array 250.

Advantageously, embodiments of the invention provide a PLC protocol converter system that allows a SCADA system to effectively communicate with a PLC device using a desired communications protocol, particularly in cases where the PLC device does not "speak" the desired communications protocol. As described above, embodiments of the invention may be used to provide read-only access to any data type within a PLC database (e.g., numeric, discrete, etc) and to provide the data using a protocol that the SCADA system understands. Further, embodiments of the invention do not require any configuration within the PLC device itself, or any processor restart/shutdown to function; can be connected/disconnected from the PLC device without any effect on the PLC device; and may be connected to the SCADA system (e.g., via a TCP connection) to allow for remote configuration, administration, and use.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for exposing data from a programmable logic controller (PLC) device, comprising:

accessing a configuration file identifying a plurality of PLC addresses to expose;

initializing a shared memory array, wherein the shared memory array includes a plurality of elements each used to store data obtained from the PLC device;

invoking a first thread, wherein the first thread is configured to, repeatedly:

transmit a request for one of the identified PLC addresses, wherein the request is configured according to a first communication protocol, wherein the first protocol comprises a Non-Intelligent Terminal Protocol (NITP), and         store a data value returned by the PLC device in response to the request in one of the elements of the shared memory array; and     invoking a second thread, wherein the second thread is configured to:

receive a request, communicated according to a second communication protocol, for one or more of the data values stored in the shared memory array,         retrieve the requested one or more data values, and         return the requested data values in a format consistent with the second communication protocol.

2. The method of claim 1, wherein the request for one or more data values is transmitted by, and returned to, a supervisory control and data acquisition (SCADA) system.

3. The method of claim 1, wherein the first protocol is used to communicate over a serial communications data link established between the PLC device and the first thread.

4. The method of claim 1, wherein the second protocol comprises a TCP/MODBUS protocol.

5. The method of claim 1, wherein the shared memory array includes at least one numeric data value.

6. The method of claim 1, wherein the shared memory array includes at least one discrete data value.

7. The method of claim 1, wherein the shared memory array includes at least one diagnostic value.

8. A non-transitory computer-readable storage medium containing a program configured to perform a method for exposing data from a programmable logic controller (PLC) device, the program including instructions for performing an operation, comprising:
   accessing a configuration file identifying a plurality of PLC addresses to expose;
   initializing a shared memory array, wherein the shared memory array includes a plurality of elements each used to store data obtained from the PLC device;
   invoking a first thread, wherein the first thread is configured to, repeatedly:
      transmit a request for one of the identified PLC addresses, wherein the request is configured according to a first communication protocol, wherein the first protocol comprises a Non-Intelligent Terminal Protocol (NITP), and
      store a data value returned by the PLC device in response to the request in one of the elements of the shared memory array; and
   invoking a second thread, wherein the second thread is configured to:
      receive a request, communicated according to a second communication protocol, for one or more of the data values stored in the shared memory array,
      retrieve the requested one or more data values, and
      return the requested data values in a format consistent with the second communication protocol.

9. The computer-readable storage medium of claim 8, wherein the request for one or more data values is transmitted by, and returned to, a supervisory control and data acquisition (SCADA) system.

10. The computer-readable storage medium of claim 8, wherein the first protocol is used to communicate over a serial communications data link established between the PLC device and the first thread.

11. The computer-readable storage medium of claim 8, wherein the second protocol comprises a TCP/MODBUS protocol.

12. The computer-readable storage medium of claim 8, wherein the shared memory array includes at least one numeric data value.

13. The computer-readable storage medium of claim 8, wherein the shared memory array includes at least one discrete data value.

14. The computer-readable storage medium of claim 8, wherein the shared memory array includes at least one diagnostic value.

15. A system, comprising:
   a processor; and
   a memory containing a program configured to perform an operation for obtaining data values from a programmable logic controller (PLC) device, the operation comprising:
      parsing a configuration file identifying a plurality of PLC addresses to expose;
      initializing a shared memory array, wherein the shared memory array includes a plurality of elements each used to store data obtained from the PLC device;
      invoking a first thread, wherein the first thread is configured to, repeatedly:
         transmit a request for one of the PLC addresses, wherein the request is configured according to a first communication protocol, wherein the first protocol comprises a Non-Intelligent Terminal Protocol (NITP), and
         store a data value returned by the PLC device in response to the request in one of the elements of the shared memory array; and
      invoking a second thread, wherein the second thread is configured to:
         receive a request, communicated according to a second communication protocol, for one or more of the data values stored in the shared memory array,
         retrieve the requested one or more data values, and
         return the requested data values in a format consistent with the second communication protocol.

16. The system of claim 15, wherein the request for one or more data values is transmitted by, and returned to, a supervisory control and data acquisition (SCADA) system.

17. The system of claim 15, wherein the first protocol is used to communicate over a serial communications data link established between the PLC device and the first thread.

18. The system of claim 15, wherein the second protocol comprises a TCP/MODBUS protocol.

19. The system of claim 15, wherein the shared memory array includes at least one numeric data value.

20. The system of claim 15, wherein the shared memory array includes at least one discrete data value.

21. The system of claim 15, wherein the shared memory array includes at least one diagnostic value.

* * * * *